US012637891B2

(12) United States Patent
Hayashi

(10) Patent No.: US 12,637,891 B2
(45) Date of Patent: May 26, 2026

(54) VEHICLE

(71) Applicant: TOYOTA JIDOSHA KABUSHIKI KAISHA, Toyota (JP)

(72) Inventor: Masatoshi Hayashi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 55 days.

(21) Appl. No.: 18/431,018

(22) Filed: Feb. 2, 2024

(65) Prior Publication Data

US 2024/0301737 A1     Sep. 12, 2024

(30) Foreign Application Priority Data

Mar. 10, 2023    (JP) ................................. 2023-037326

(51) Int. Cl.
| | |
|---|---|
| *E05F 15/40* | (2015.01) |
| *B60J 5/10* | (2006.01) |
| *B60R 1/26* | (2022.01) |
| *H04N 7/18* | (2006.01) |

(52) U.S. Cl.
CPC ................ *E05F 15/40* (2015.01); *B60R 1/26* (2022.01); *H04N 7/183* (2013.01); *B60J 5/101* (2013.01); *E05Y 2400/54* (2013.01); *E05Y 2900/532* (2013.01); *E05Y 2900/548* (2013.01)

(58) Field of Classification Search
CPC .. E05F 15/40; B60R 1/26; H04N 7/183; B60J 5/101; E05Y 2400/54; E05Y 2900/532; E05Y 2900/548
See application file for complete search history.

(56) References Cited

U.S. PATENT DOCUMENTS

| | | | |
|---|---|---|---|
| 2017/0030136 A1* | 2/2017 | Ihlenburg | ................ E05F 15/73 |
| 2018/0312114 A1* | 11/2018 | Inoue | ........................ B60R 1/23 |
| 2020/0291706 A1* | 9/2020 | Kimura | .................. E05F 15/40 |

FOREIGN PATENT DOCUMENTS

| | | |
|---|---|---|
| JP | 2016-030973 A | 3/2016 |
| JP | 2017-149212 A | 8/2017 |
| JP | 2020-066866 A | 4/2020 |
| JP | 2020-148060 A | 9/2020 |
| JP | 2021-000911 A | 1/2021 |
| JP | 2021-126976 A | 9/2021 |

* cited by examiner

*Primary Examiner* — Anne Marie Antonucci
*Assistant Examiner* — Misa H Nguyen
(74) *Attorney, Agent, or Firm* — SoraIP, Inc.

(57) ABSTRACT

When there is a request to open the luggage compartment door, the ECU performs processing including the following steps: activating the back camera, acquiring a moving image, displaying the moving image on the display device, acquiring a still image, calculating the distance to the object in the image, stopping the operation of the luggage compartment door when the distance to the object is less than or equal to a threshold, stopping the display on the display device, and performing an opening operation of the luggage compartment door when the distance to the object is greater than the threshold.

6 Claims, 2 Drawing Sheets

VEHICLE

CROSS-REFERENCE TO RELATED APPLICATION

This application claims priority to Japanese Patent Application No. 2023-037326 filed on Mar. 10, 2023 incorporated herein by reference in its entirety.

BACKGROUND

1. Technical Field

The present disclosure relates to a vehicle.

2. Description of Related Art

For example, Japanese Unexamined Patent Application Publication No. 2021-126976 (JP 2021-126976 A) discloses a vehicle including a damper stay for electrically opening and closing a luggage compartment door at the rear of the vehicle.

SUMMARY

If the luggage compartment door is close to an obstacle such as a rear wall of a parking space or an obstacle such as a ceiling above the parking space of the vehicle is low, however, the luggage compartment door may come into contact with the obstacle when the luggage compartment door is electrically opened.

The present disclosure has been made to solve the above problem, and has an object to provide a vehicle in which contact with an obstacle is suppressed during an opening/closing operation of a rear door.

A vehicle according to an aspect of the present disclosure includes: a door that is provided at a rear of the vehicle and is openable and closable by turning about a hinge; a camera provided on the door; an opening and closing device configured to open and close the door by using an actuator; and a control device configured to control an operation of the opening and closing device. The control device is configured to: when a request to open the door is received, calculate a distance between the door and any object in an image captured by the camera; and stop an operation of the door when the calculated distance is equal to or smaller than a threshold.

Thus, the operation of the door at the rear of the vehicle is stopped when the request to open the door is received and the distance from the object imaged by the camera is equal to or smaller than the threshold. Therefore, contact of the door at the rear of the vehicle with the obstacle can be suppressed.

In one embodiment, the control device may be configured to calculate a distance from an object in the image that is closer to the door than other objects.

Thus, it is possible to calculate the distance from the object that may be an obstacle compared with other objects in the image when opening the door.

In one embodiment, the camera may include a camera configured to capture an image of the rear of the vehicle when the vehicle moves rearward.

Thus, the distance from the obstacle when opening the door can be calculated by using the camera that captures an image of the rear of the vehicle when the vehicle moves rearward. Therefore, there is no need to separately provide a dedicated camera. Accordingly, an increase in the number of components can be suppressed.

In one embodiment, the vehicle may further include a display device provided at a position where the display device is visible to a user seated in a vehicle cabin. The control device may be configured to, when the request to open the door is received, cause the display device to display a moving image captured by the camera.

By viewing the display device, the user can recognize, for example, the presence or absence of an obstacle when opening the door at the rear of the vehicle.

According to the present disclosure, it is possible to provide the vehicle in which the contact with the obstacle is suppressed during the opening/closing operation of the rear door.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
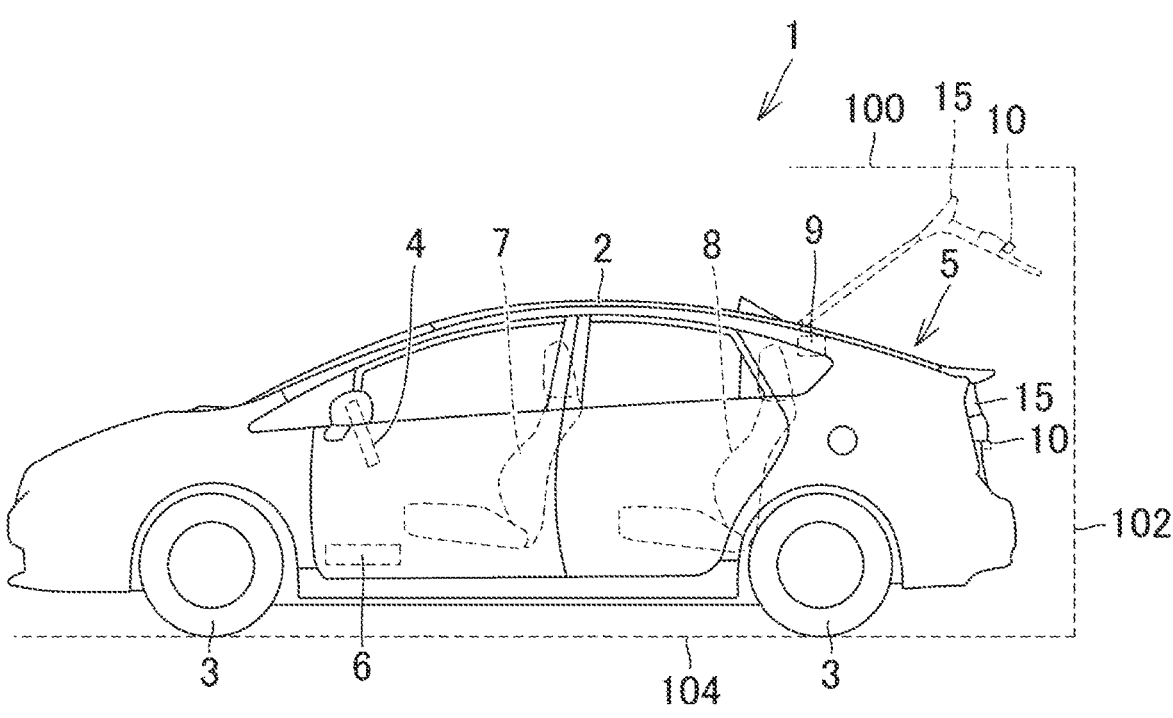
FIG. 1 is a diagram schematically showing an example of the overall configuration of a vehicle according to the present embodiment.

Hereinafter, an embodiment of the present disclosure will be described in detail with reference to the drawings. In the drawings, the same or corresponding portions are denoted by the same reference signs and the description thereof will not be repeated.

FIG. 1 is a diagram schematically showing an example of the overall configuration of a vehicle 1 according to the present embodiment. In the present embodiment, the vehicle 1 may be, for example, a vehicle that uses an engine as a drive source, a battery electric vehicle that uses an electric motor as a drive source, or is equipped with an engine and an electric motor, and at least It may also be a hybrid electric vehicle using either of these as a driving source.

As shown in FIG. 1, a vehicle 1 includes a body 2, a plurality of wheels 3, a display device 4, a back door unit 5, an electronic control unit (ECU) 6, a front seat 7, and a rear seat 8. The back door unit 5 includes an actuator 9, a back camera 10, and a luggage compartment door 15.

Further, FIG. 1 shows a case where the vehicle 1 is parked in a flat parking space 104. A wall 102 is provided on the rear side of the vehicle 1 in the parking space 104. It is assumed that the wall 102 has a plane perpendicular to the plane of the parking space 104. Note that the structure of the wall 102 as described above is just an example, and is not limited to having a flat surface. Further, a ceiling 100 is provided above the vehicle 1. It is assumed that the ceiling 100 has a plane that is parallel to the plane of the parking space 104 and perpendicular to the plane of the wall 102. Note that the structure of the ceiling 100 as described above is an example, and is not limited to having a flat surface.

The back door unit 5 is configured to be able to open and close the luggage compartment door 15 using the driving force of the actuator 9. The actuator 9 is configured by, for example, a motor or the like, and is driven according to a control signal from the ECU 6.

The back camera 10 is provided at a predetermined position where it can photograph the rear of the vehicle 1 when the luggage compartment door 15 is in a closed state. The back camera 10 transmits data of captured moving images to the ECU 6. The ECU 6 is configured to be able to display received moving image data on the display device 4.

The luggage compartment door 15 is provided, for example, at an opening of a luggage compartment provided behind the rear seat 8 of the vehicle 1. The luggage compartment door 15 is configured to be able to open the luggage compartment opening by lifting the rear end of the door above the vehicle 1 around a mechanism such as a hinge (not shown) provided in front and above the luggage compartment opening. The actuator 9 is configured to apply a driving force to the luggage compartment door 15 and change the position of the luggage compartment door 15 within its movable range. As for the mechanism for applying the driving force of the actuator 9 in the movable direction of the luggage compartment door 15, a known technique may be used, and a detailed explanation thereof will not be given.

The display device 4 is composed of a display unit such as a touch panel display, and displays images, text information, etc. on the screen in response to control signals from the ECU 6. The display device 4 is provided at a position that is visible to a user seated in the vehicle cabin.

The ECU 6 is a computer that includes a processor such as a CPU that executes a program, a memory, and an input/output interface. ECU 6 includes various control programs for controlling various actuators installed in vehicle 1. The various control programs include, for example, a control program for at least one of steering control, drive control, and braking control. Further, in this embodiment, the various control programs further include a control program that controls the actuator 9 that opens and closes the luggage compartment door 15.

Figure 2:
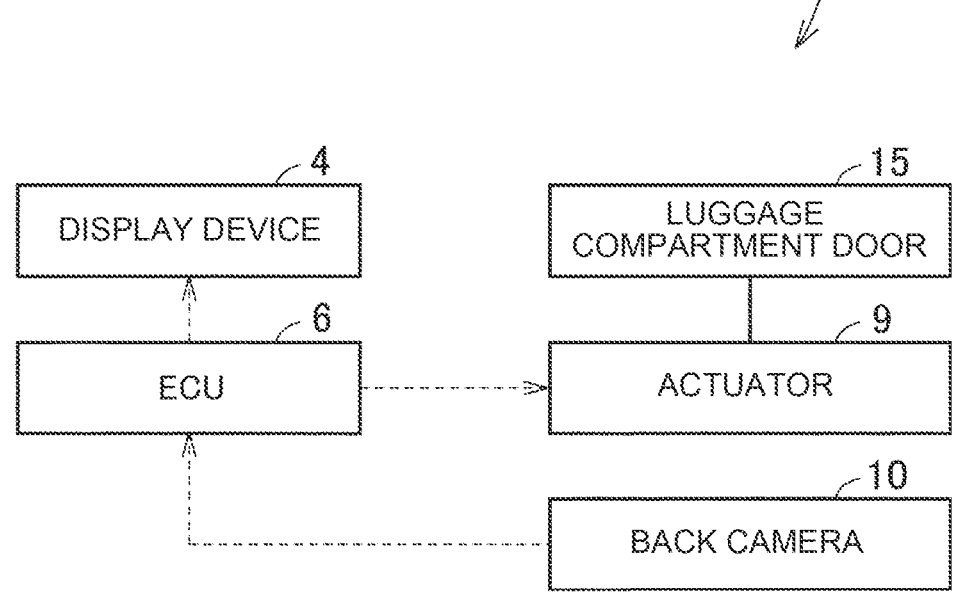
FIG. 2 is a diagram showing an example of the configuration of functional blocks of a vehicle.

FIG. 2 is a diagram showing an example of the configuration of functional blocks of the vehicle 1. As shown in FIG. 2, the ECU 6 receives moving image data from the back camera 10, and also sends control signals to the actuator 9 that opens and closes the luggage compartment door 15, and sends control signals to the display device 4.

For example, when the ECU 6 receives an operation for opening the luggage compartment door 15, the ECU 6 controls the actuator 9 so that the luggage compartment door 15 is opened. The operation for opening the luggage compartment door 15 may be, for example, an operation on a switch (not shown) provided on a dash panel inside the vehicle 1 or a touch panel. Further, the operation for opening the luggage compartment door 15 may be an operation on a switch, a non-contact sensor (none of which is shown), etc. provided on the luggage compartment door 15.

In the vehicle 1 having the above-described configuration, if the distance between the parking space 104 and the rear wall 102 is short or the height of the ceiling 100 is low, when the luggage compartment door 15 opens electrically, the luggage compartment door 15 may come into contact with obstacles such as the wall 102 or the ceiling 100.

Therefore, in this embodiment, when the ECU 6 receives a request to open the luggage compartment door 15, the ECU 6 calculates the distance between the luggage compartment door 15 and any object in the image taken by the back camera 10. It is assumed that the operation of the luggage compartment door 15 is stopped when the calculated distance is less than or equal to the threshold. In this way, it is possible to suppress the luggage compartment door 15 from coming into contact with obstacles.

Figure 3:
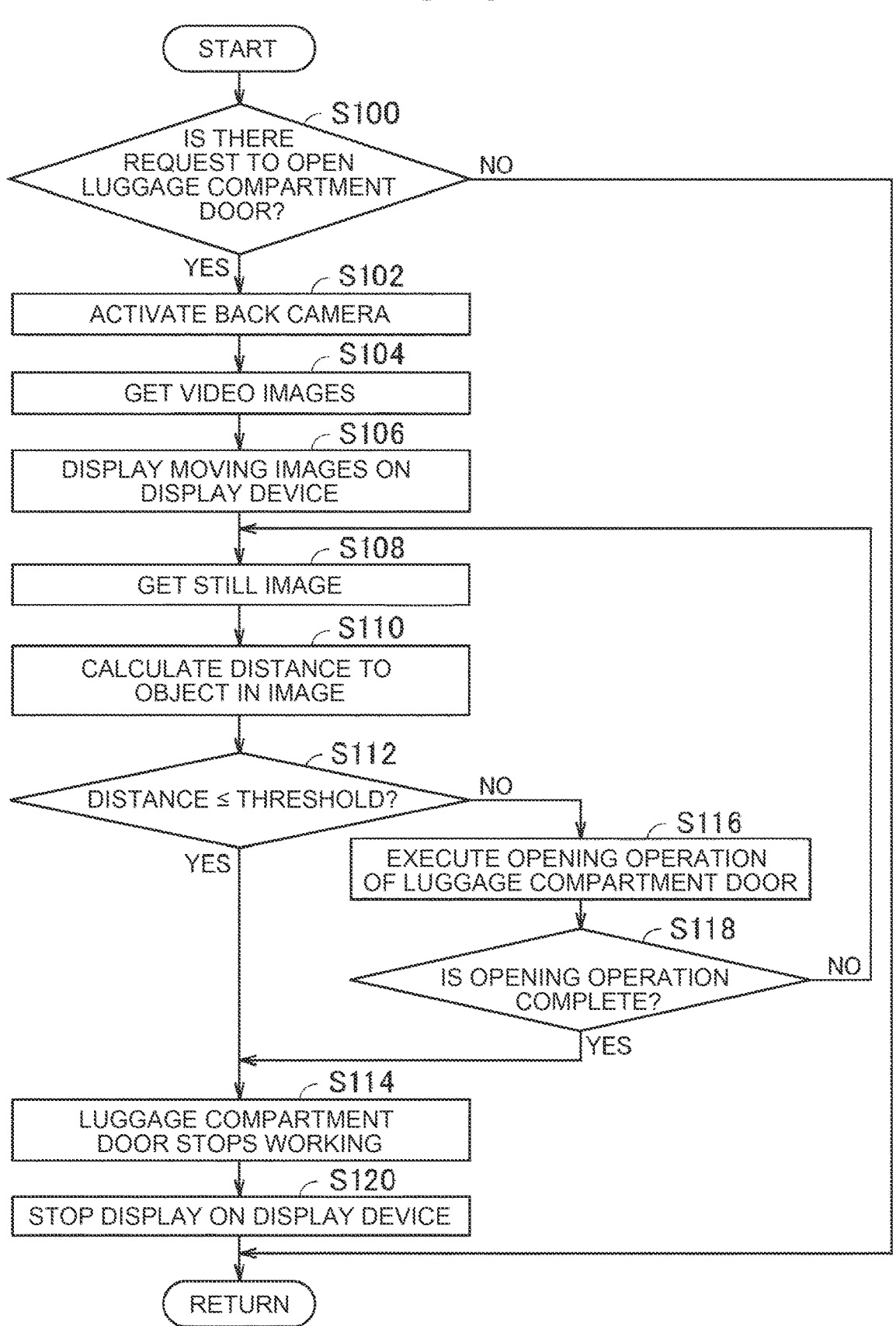
FIG. 3 is a flowchart showing an example of processing executed by the ECU.

An example of processing executed by the ECU 6 will be described below. FIG. 3 is a flowchart showing an example of processing executed by the ECU 6. A series of processes shown in this flowchart are repeatedly executed in the ECU 6 at predetermined intervals.

At step (hereinafter referred to as S) 100, the ECU 6 determines whether there is a request to open the luggage compartment door 15. When the ECU 6 receives an operation for opening the luggage compartment door 15 as described above, it determines that there is a request to open the luggage compartment door 15. If it is determined that there is a request to open the luggage compartment door 15 (YES in S100), the process moves to S102.

At S102, the ECU 6 activates the back camera 10. More specifically, the ECU 6 executes startup processing to enable photographing using the back camera 10 by supplying power, etc., and to output data of the photographed moving image. After that, the process moves to S104.

At S104, the ECU 6 acquires a moving image. The ECU 6 acquires moving image data transmitted from the back camera 10. For example, the ECU 6 acquires data of moving images after the last acquisition. The ECU 6 may, for example, store the acquired moving image data in a storage device such as a buffer memory that temporarily stores the data. The process then moves to S106.

At S106, the ECU 6 displays the acquired moving image on the display device 4. The ECU 6 outputs the acquired moving image data to the display device 4 and causes the display device 4 to display the moving image. Note that the ECU 6 may display, for example, text information indicating that the luggage compartment door 15 is in the opening operation as an image superimposed on the moving image. The process then moves to S108.

At S108, the ECU 6 acquires a still image. The ECU 6 acquires any image included in the moving image data. For example, the ECU 6 may acquire, as a still image, the latest image in chronological order among a plurality of images forming the acquired moving image. After that, the process moves to S110.

At S110, the ECU 6 calculates the distance to the object in the image. The method of calculating the distance to the object in the photographing direction using the acquired still image may be any known technique and is not particularly limited. The target object includes, for example, the object at the closest distance among the plurality of objects photographed in the acquired still image. For example, the ECU 6 learns in advance the relationship between the degree of partial blur in an image and the relative distance based on the focal length of the camera, and stores learning data, or receives learning data from the outside. The ECU 6 may perform image processing on the captured image using the learning data, estimate the distance between the back camera 10 and the object corresponding to each pixel in the image, and calculate the object with the closest distance among the estimated distances as the distance to the target object. After that, the process moves to S112.

In S112, the ECU 6 determines whether the distance to the object is less than or equal to a threshold. The threshold may be a predetermined value. For example, when stopping the operation of the luggage compartment door 15, the luggage compartment door 15 becomes an obstacle before the luggage compartment door 15 completely stops operating. Set to a value that does not touch. The threshold is adapted by experiment or the like. If it is determined that the distance to the target object is less than or equal to the threshold (YES in S112), the process moves to S114.

At S114, the ECU 6 controls the actuator 9 to stop the operation of the luggage compartment door 15. If the opening operation of the luggage compartment door 15 has not started, the ECU 6 suppresses the operation of the luggage compartment door 15 by not starting the opening operation. The ECU 6 controls the actuator 9 to stop the operation of the luggage compartment door 15 when the opening operation of the luggage compartment door 15 is in progress. The process then moves to S120. Note that if it is determined that the distance to the target object is greater than the threshold (NO in S112), the process moves to S116.

In S116, the ECU 6 executes an operation to open the luggage compartment door 15. The ECU 6 drives the actuator 9 to operate the luggage compartment door 15 so that the luggage compartment door 15 is in an open state. After that, the process moves to S118.

At S118, the ECU 6 determines whether the opening operation is completed. The ECU 6 may determine that the opening operation is completed when the total drive amount or total drive time after starting the drive of the actuator 9 reaches an upper limit, or alternatively, the ECU 6 may determine that the opening operation is completed when the luggage compartment door 15 reaches a predetermined open state. Alternatively, the ECU 6 estimates the rotation angle of a rotating part such as a hinge of the luggage compartment door 15 based on the image in the closed state from the acquired image, and determines when the estimated rotation angle reaches a predetermined value. It may be determined that the opening operation is completed when the opening operation is completed. If it is determined that the opening operation has been completed (YES in S118), the process moves to S114. Note that if it is determined that the opening operation is not completed (NO in S118), the process moves to S108.

At S120, the ECU 6 stops displaying on the display device. Note that the ECU 6 may cause the display device 4 to display text information indicating that the opening operation of the luggage compartment door 15 has been stopped due to an obstacle, for example, as an image. The process is then terminated.

The operation of the ECU 6 of the vehicle 1 according to the present embodiment will be described based on the structure and flowchart as described above.

For example, assume that the vehicle 1 is parked in a parking space 104 as shown in FIG. 1, and the luggage compartment door 15 of the vehicle 1 is in a closed state. When the driver riding in the vehicle 1 performs an operation to open the luggage compartment door 15 from the driver's seat, for example, it is determined that there is a request to open the luggage compartment door 15 (YES in S100), and the back camera is activated. It is activated (S102).

When moving image data is acquired from the activated back camera 10 (S104), the moving image is displayed on the display device 4 using the acquired data (S106). Then, the latest image is acquired as a still image (S108), and the distance to the object in the image is calculated using the acquired still image (S110).

At this time, when the luggage compartment door 15 is in the closed state, the distance to the object in the image behind the vehicle 1 is calculated. If it is determined that the distance to the object is greater than the threshold (NO in S112), the opening operation of the luggage compartment door is executed (S116), so that the actuator 9 is controlled to lift the rear end of the luggage compartment door 15 upward. If the opening operation is not completed and it is determined that the distance to the object is greater than the threshold (NO in S118), the above-mentioned operation is repeated and the opening operation of the luggage compartment door 15 continues.

As the luggage compartment door 15 opens, the photographing direction of the back camera 10 becomes upward, and the distance to objects (including the ceiling 100 and walls 102) in the image in the photographing direction is calculated. Furthermore, the objects displayed on the display device 4 change from the wall 102 to the ceiling 100 as the luggage compartment door 15 opens.

Then, if the distance to the object in the image (either the ceiling 100 or the wall 102, whichever is closer) becomes less than or equal to the threshold (YES in S112), the operation of the luggage compartment door 15 is stopped (S114). Display of the moving image photographed by the back camera 10 on the display device 4 is stopped (S120).

Note that, for example, if the vehicle is parked at a position closer to the rear wall 102 than the position shown in FIG. 1, the operation of the luggage compartment door 15 will be stopped when the distance with the rear wall 102 becomes the threshold or less. Further, when the luggage compartment door 15 is in the closed state and the distance from the rear wall 102 becomes less than or equal to a threshold, the opening operation of the luggage compartment door 15 is suppressed.

As described above, according to the vehicle 1 according to the present embodiment, when there is a request to open the luggage compartment door 15, the distance to the luggage compartment door 15 in the image taken by the back camera 10 is when the distance to an object that is closer than the object (for example, the ceiling 100 or wall 102) is less than or equal to the threshold, the operation of the luggage compartment door 15 is stopped, so that the luggage compartment door 15 coming into contact with the obstacle can be suppressed. Therefore, it is possible to provide a vehicle that suppresses contact with obstacles during the opening/closing operation of the rear door.

Furthermore, since the back camera 10 is a camera that photographs the rear of the vehicle 1 when the vehicle 1 is reversing, there is no need to separately provide a camera for calculating the distance to an obstacle behind the vehicle 1, and the number of parts can be reduced. The increase can be suppressed.

Furthermore, when receiving a request to open the luggage compartment door 15, a moving image taken by the back camera 10 is displayed on the display device 4, so that the user can recognize the reason why the luggage compartment door 15 is not completely opened by the moving image displayed on the display device 4.

Hereinafter, modifications will be described.

In the above-described embodiment, the luggage compartment door 15 has been described as an example of the rear door of the vehicle 1, but it may be any door to which the back camera 10 is attached, and is not particularly limited to the luggage compartment door.

Further, in the above-described embodiment, the back camera 10 was described as a camera that photographs the rear of the vehicle 1, but it is preferable to use a camera with a wider angle. In this way, for example, the photographing range in the vertical direction becomes wider, so it is possible to accurately determine whether the ceiling 100 or the wall 102 exists as an obstacle in the movable range of the luggage compartment door 15.

Furthermore, in the above-described embodiment, the distance to the object in the image photographed by the back camera 10 is calculated, but for example, it may determine whether there is an obstacle within the rotation range of the luggage compartment door 15 shown in the image photographed by the back camera 10, calculate the distance to the obstacle when it is determined that there is an obstacle, and stop the operation of the luggage compartment door 15 when the calculated distance is less than or equal to the threshold.

In addition, the above-mentioned modifications may be carried out by appropriately combining all or a part thereof.

The embodiment disclosed herein should be considered to be exemplary and not restrictive in all respects. The scope of the present disclosure is shown by the scope of claims rather than the description above, and is intended to include all modifications within the meaning and the scope equivalent to the scope of claims.

What is claimed is:

1. A vehicle comprising:

a door that is provided at an opening of a luggage compartment provided behind a rear seat of the vehicle in a front-back direction of the vehicle;

a display that is visible to a user in a vehicle cabin;

a camera provided on the door;

an actuator configured to apply driving force to the door in a movable direction of the door to open and close the door by turning about a hinge; and a processor configured to receive an operation to the display by the user in a state where the door is closed, the operation requesting the door to open, start displaying on the display a video recorded by the camera in response to receiving the operation to the display requesting the door to open, acquire a captured image from the video after starting to display the video, calculate a distance between the door and an object in the captured image, determine whether the calculated distance is equal to or smaller than a threshold, cause the actuator to perform an opening operation of the door in a case where a first determination is made that the calculated distance is greater than the threshold, stop displaying the video recorded by the camera in response to a completion of the opening operation, and prohibit the opening operation of the door and stop displaying the video recorded by the camera, in response to a second determination that the calculated distance is equal to or smaller than the threshold.

2. The vehicle according to claim 1, wherein the processor is configured to calculate a distance between the door and the object in the captured image that is closer to the door than other objects.

3. The vehicle according to claim 1, wherein the camera includes a camera configured to capture an image of a rear of the vehicle when the vehicle moves rearward.

4. The vehicle according to claim 1, wherein the processor is further configured to learn a relationship between a degree of partial blur in the captured image and a distance between the object and the camera based on a focal length of the camera, and the distance between the door and the object in the captured image is calculated based on the learned relationship.

5. The vehicle according to claim 1, wherein the opening operation is prohibited by stopping the opening operation after an initiation of the opening operation in response to the second determination made between the initiation and the completion of the opening operation, and prohibiting the initiation of the opening operation in a case where the second determination is made before the initiation of the opening operation.

6. The vehicle according to claim 1, wherein the processor is configured to display on the display text information indicating that the opening operation has been prohibited in response to prohibiting the opening operation.

\* \* \* \* \*